United States Patent
Motika et al.

(10) Patent No.: US 9,069,989 B2
(45) Date of Patent: Jun. 30, 2015

(54) CHIP AUTHENTICATION USING SCAN CHAINS

(75) Inventors: Franco Motika, Hopewell Junction, NY (US); Dirk Pfeiffer, Croton on Hudson, NY (US); Peilin Song, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 537 days.

(21) Appl. No.: 13/360,267

(22) Filed: Jan. 27, 2012

(65) Prior Publication Data

US 2013/0198873 A1 Aug. 1, 2013

(51) Int. Cl.
G06F 21/73 (2013.01)
G01R 31/3185 (2006.01)
G01R 31/3183 (2006.01)
G06F 7/58 (2006.01)

(52) U.S. Cl.
CPC .......... *G06F 21/73* (2013.01); *G01R 31/318547* (2013.01); *G01R 31/318328* (2013.01); *G01R 31/318541* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 5,079,725 A | 1/1992 | Geer et al. | |
| 6,496,423 B2 | 12/2002 | Lammers et al. | |
| 6,581,190 B1 | 6/2003 | Dixon et al. | |
| 7,136,319 B2 | 11/2006 | Uvieghara | |
| RE40,188 E | 3/2008 | Lofstrom | |
| 7,787,034 B2 | 8/2010 | Ying et al. | |
| 8,516,316 B2 * | 8/2013 | Lam et al. | 714/726 |
| 8,890,562 B1 * | 11/2014 | Hartanto | 324/762.06 |
| 2004/0230884 A1 * | 11/2004 | Rajski et al. | 714/742 |
| 2011/0239069 A1 * | 9/2011 | Ramaraju et al. | 714/731 |

FOREIGN PATENT DOCUMENTS

JP 08-136619 5/1996

OTHER PUBLICATIONS

Chang et al., "Synthesis-for-Testability Watermarking for Field Authentication of VLSI Intellectual Property", IEEE Transactions on Circuits and Systems I: Regular Papers vol. 57, Issue: 7, Jul. 2010, pp. 1618-1630.
Majzoobi et al., "Time-bounded Authentication of FPGAs" Information Forensics and Security, IEEE Transactions on vol. PP, Issue: 99, Sep. 2011. (13 pages).

* cited by examiner

*Primary Examiner* — Jung Kim
*Assistant Examiner* — Tri Tran
(74) *Attorney, Agent, or Firm* — Tutumjian & Bitetto, P.C.; Anne V. Dougherty

(57) ABSTRACT

Methods and systems for generating a circuit identification number include determining a propagation time delay across a scan chain of known length; comparing the propagation time delay to a threshold associated with the scan chain length; storing an identifier bit based on the result of the comparison; repeating the steps of determining, comparing, and storing until a number of stored identifier bits reaches a threshold number; and outputting the stored identifier bits.

25 Claims, 6 Drawing Sheets

CHIP AUTHENTICATION USING SCAN CHAINS

BACKGROUND

1. Technical Field

The present invention relates to integrated circuit design and, more particularly, to chip authentication using scan chains having characteristic properties based on process variations.

2. Description of the Related Art

As electronic devices become increasingly interconnected, integrated circuits (ICs) are relied on more and more for performing security sensitive tasks, as well as for handling sensitive information. Therefore a need exists for ICs to be able to perform operations such as authentication, protection of confidential information, and secure communication in an inexpensive, yet highly secure way.

Existing solutions use on-chip ring oscillators as vehicles to authenticate ICs. Ring oscillators include an odd number of inversion delay circuit elements in a ring, such that a signal propagates continuously through the ring, switching an output with every cycle. Process variations cause variations in the delay length of each delay element, such that each ring oscillator will change its outputs at a unique output frequency that is randomly determined at the time of formation, which can be used as a signature or fingerprint for the IC. However, to increase the security level, additional ring oscillators are employed. These single-purpose ring oscillators substantially increase cost and circuit size and, as such, ring oscillator solutions do not scale well to contexts that demand high degrees of security.

SUMMARY

A method for generating an identifying number is shown that includes determining a propagation time delay across a scan chain of known length; generating one or more identifier bits based on the propagation time delay using a processor; repeating said determining and generating until a number of stored identifier bits reaches a predetermined number; and outputting the stored identifier bits.

A method for generating an identifying number is shown that includes determining a propagation time delay across a scan chain of known length; comparing the propagation time delay to a threshold associated with the scan chain length; storing an identifier bit based on the result of said comparison; repeating said determining, comparing, and storing until a number of stored identifier bits reaches a predetermined number; and outputting the stored identifier bits.

A further method for generating an identifying number is shown that includes selecting a scan chain of known length from a plurality of scan chains; determining a propagation time delay across the selected scan chain; comparing the propagation time delay to a threshold associated with the scan chain length; storing an identifier bit based on the result of said comparison; repeating said selecting determining, comparing, and storing until a number of stored identifier bits reaches a predetermined number; and outputting the stored identifier bits. Storing the identifier bit includes storing a first state for the identifier bit if the propagation time delay exceeds the threshold; storing a second state for the identifier bit if the propagation time delay is below the threshold; storing a third state for the identifier bit if the propagation time delay is within a predetermined range of the threshold; and storing the third state for the identifier bit if the propagation time delay is above a second, timeout threshold.

A chip identifier circuit is shown that includes one or more scan chains of known length having an associated expected delay; a pulse generator configured to send a pulse through the one or more scan chains; a counter configured to determine a pulse delay; and a processor configured to generate an identifier bit based on the determined pulse delay.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
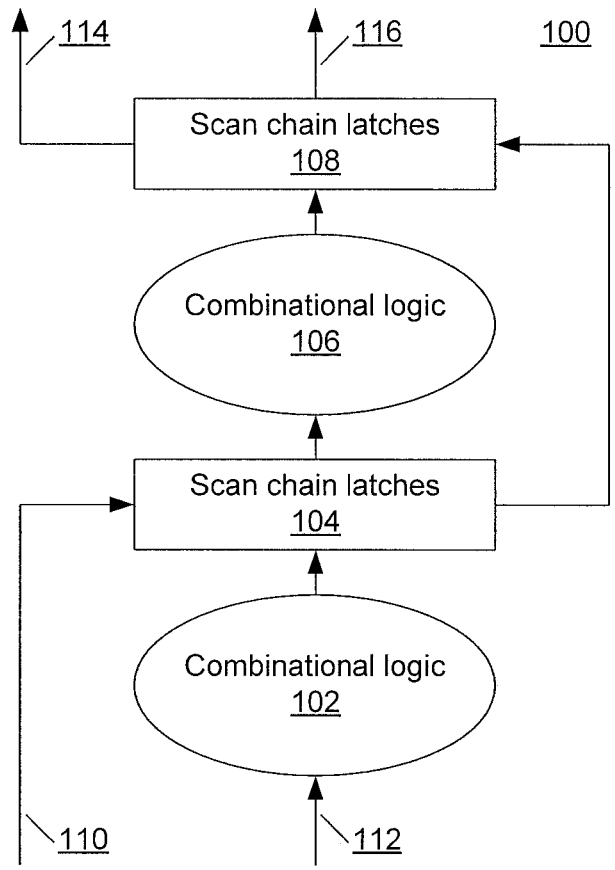
FIG. 1 is a diagram of a scan chain testable logic system in accordance with the present principles.

The present principles provide chip authentication using scan chains. Scan chains are commonly used to provide circuit testing systems. Very-large-scale integration chips frequently use scan chains, which can significantly simply the generation of test patterns, improve diagnostics, reduce test time, and reduce cost. Besides the test benefits, scan chains are used for chip sorting where an electrical signal (e.g., a pulse) can pass through the scan chain to measure the delay along the chain. By forming a scan chain in many chains having differing lengths, the present principles provide for the use of scan chain testing systems to additionally provide a circuit-unique identifier that may be used for circuit authentication. The width of output pulses—a quantity related to the delay associated with a given scan chain—is used to produce such an identifier. Because the scan chain will be present anyway for testing purposes, this imposes a minimal overhead on existing chip designs. Furthermore, additional identifier bits may be generated by increasing the number of chains measured, such that an arbitrary number of bits may be generated with a given scan chain system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a schematic of a circuit 100 using a scan chain testing system is shown. The circuit 100 includes a sequence of combinational logic modules 102 and 106 interspersed with scan chain latches 104 and 108. During regular operation of the circuit 100, combinational logic 102 receives an input 112 and performs its operations, outputting to latches 104. The latches 104 act as a set of one-bit storage elements, providing the output of combinational logic 102 to combinational logic 106. Similarly, logic 106 processes its input and outputs to latches 108.

During scan operation, however, a scan input 110 is received at the scan chain latches 104. Whereas the latches 104 are arranged in parallel when receiving signals from logic 102, the latches 104 are connected serially along the scan path 110. The output of scan chain latches 104 may be provided directly to scan chain latches 108 as shown, or each bank of scan chain latches may be separately tested. In this manner, problems may be readily isolated.

Level sensitive scan design (LSSD) systems, such as circuit 100, exemplify a system and design-for-test approach that incorporates basic test concepts including scan design. In such a design, most of the devices storage elements, e.g., latches 104 and 108, are concatenated in one or more scan chains and can be externally accessed via one or more serial inputs 110 and outputs 114. Additional storage elements not in this category are, e.g., memory or other special macros that are isolated and tested independently. This design methodology ensures that all logic feedback paths, e.g., 102 and 106, are gated by one or more of these storage elements 104 and 108. Each bank of scan chain latches 104 or 108 may include thousands of individual latches. LSSD systems thereby simplify the testing and diagnosis of very complex logic structures.

Figure 2:
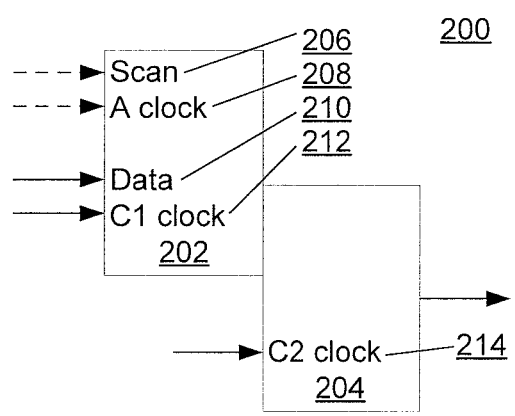
FIG. 2 is a diagram of a single element of a scan chain in accordance with the present principles.

Referring now to FIG. 2, a diagram of an exemplary set of scan chain latches 104 is shown. Two latches 202 and 204 are in an L1/L2 arrangement 200, where the output of the latch 202 feeds into the input of the latch 204. The master latch 202 has a scan input port 206 and a data input port 210, with associated clocks A 208 and C1 212. The slave latch 204 has a single input that receives the output of master latch 202 and has an associated clock C2 214 that is out of phase with the clock(s) of the master latch 202. A bank of latches 104 may include any number of such L1/L2 arrangements 200 in parallel during operation, each receiving a data input 210 from, e.g., combinational logic 102 and being triggered by common C1/C2 clocks 204 and 214.

Figure 3:
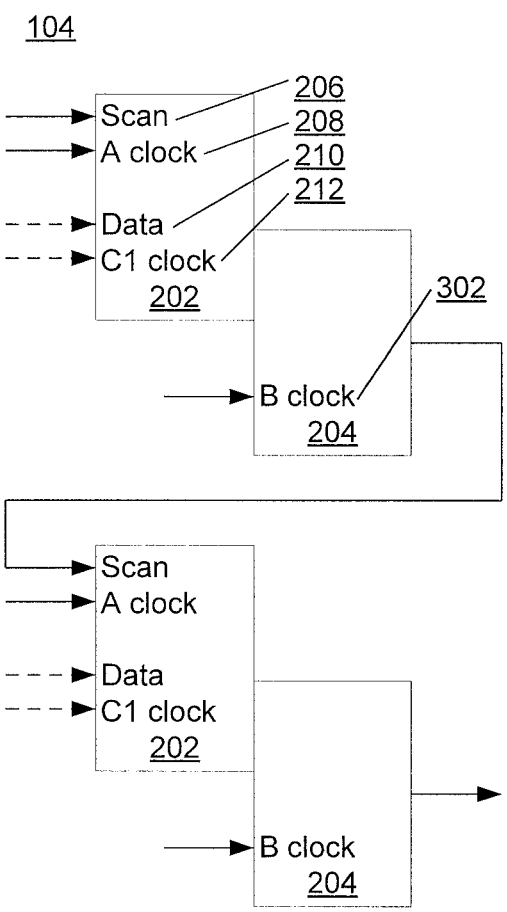
FIG. 3 is a diagram of two scan chain elements connected serially in a scan mode in accordance with the present principles.

Referring now to FIG. 3, a number of L1/L2 arrangements 200 is shown in a bank of scan chain latches 104 as implemented during a scan mode. In this case, the data input 210 and C1 clock 212 are not used, with instead the scan input 206 and A clock 208 triggering the master latches 202. Again, the master latches 202 output to their respective slave latches 204, which in turn is triggered by a scan clock B 302.

The scan chain latches 104 are structurally distinguished in scan mode from the latches in operational mode by the fact that each slave latch 204, rather than providing its output to, e.g., further combinational logic 106, outputs its signal to a next master latch 202. Although only one such connection is shown in FIG. 3, it is contemplated that any number of L1/L2 arrangements 200 may be employed to form a single scan chain 104.

Implementing such a scan chain 104, a flush test may be employed. In a flush test, the A and B scan clocks 208 and 302 are operated continuously while a transition edge passes through the chain 104. So, for example, in a scan chain 104 where all of the latches output a logical "0", a transition to a logical 1 is provided to the first master latch 202 and that transition propagates along each subsequent latch until reaching a final output. The arrival of the signal at the end of the chain 114 is determined primarily by the length of the chain. However, due to random process variations, a pulse that is applied at the input 110 to the scan chain 104 will have some random variance in its length as compared to what is expected from the design. This variance can be exploited, because every scan chain that is implemented will have its own characteristic and repeatable associated delay.

Figure 4:
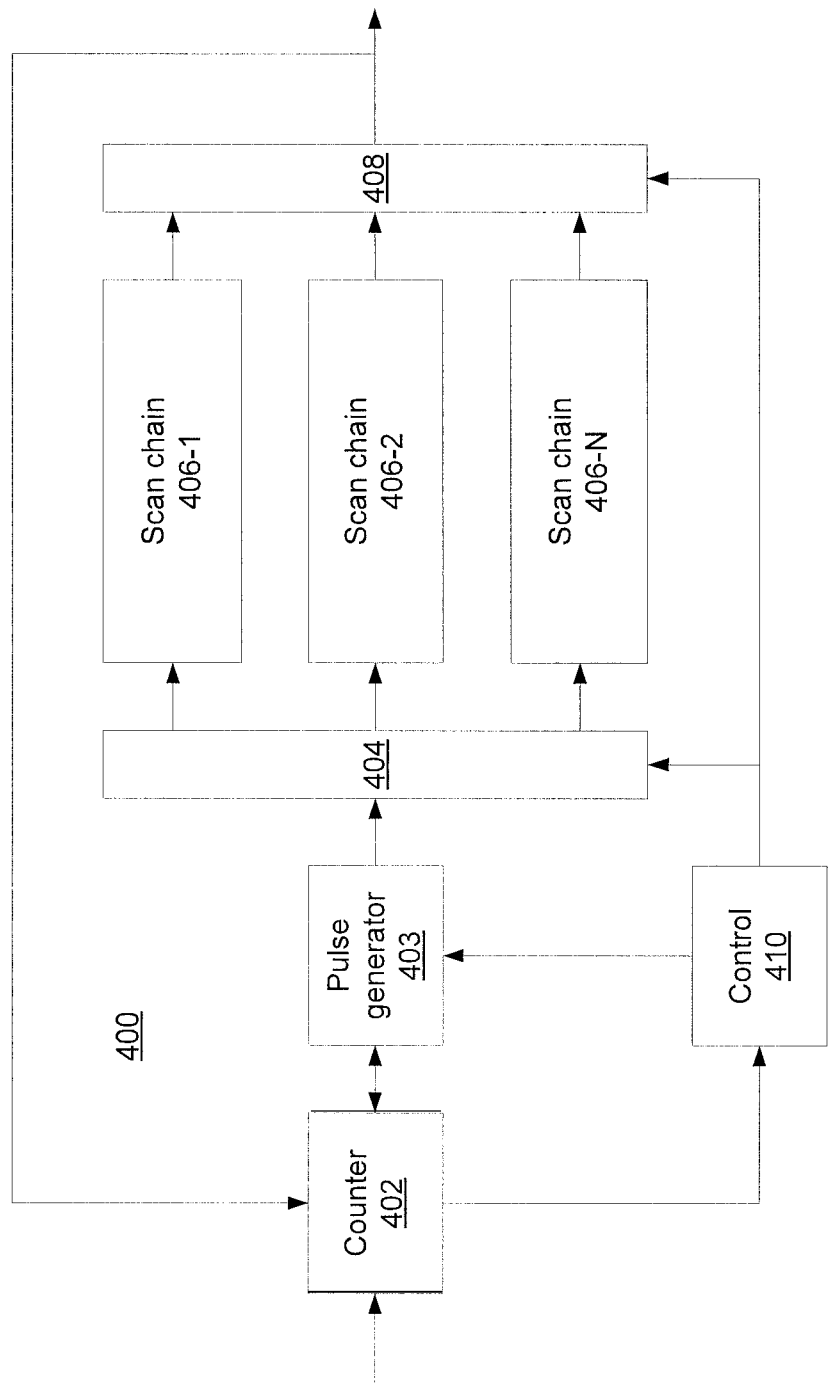
FIG. 4 is a diagram of a chip identifying circuit in accordance with the one illustrative embodiment.

Referring now to FIG. 4, an embodiment of an authentication code generation system 400 is shown according to the present principles. In this embodiment, a full scan chain 104-106 has been divided into a number of scan chain segments 406. These segments 406 may be of arbitrary size. In particular, the scan chains 406 may have a consistent length or may have varying lengths—a longer chain will have a greater expected variance in its associated delay due to the accumulation of random errors, but using additional scan chains 406 provides for a larger number of bits for the chip identifier.

A periodic clock signal is provided to counter 402 which, in communication with pulse generator 403, determines the length of a given pulse. Pulse generator 403 feeds a pulse to multiplexer 404, and said multiplexer 404 passes the pulse signal to one of the scan chains 406. The scan chain 406 is selected by a control module 410, which provides its choice to the multiplexer 404. Control module 410 also determines when pulse generator 403 begins sending its pulse to the multiplexer 404.

The output of the scan chains 406 feed into an optional multiplexer 408, also controlled by control module 410, which provides a scan chain output to, e.g., a built-in self-test engine. The multiplexer 408 may be omitted, such that the outputs of all of the scan chains terminate at a single output line, but the multiplexer may be included for compatibility with existing scan designs. The scan chain output is also provided to counter 402 for the purpose of detecting a transition in the pulse.

The counter 402 provides a count or time period for a pulse delay between the beginning of a scan chain 406 and the end. This number is provided to control 410, which uses the delay time to generate identifier bits. One approach for doing this is to simply use the counter value directly. In this case, temperature calibration is performed using a temperature sensor. If a chip does not include a temperature sensor, an alternative embodiment is possible wherein the delay time is compared to a threshold associated with the selected scan chain 406 that is based on, e.g., an expected delay based on the number of latches in the chain 406. This provides a binary output, such that the selected scan chain 406 produces a single digit of a chip identifier. The control 410 may then direct the multiplexers 404 and 408 to select the next scan chain 406 and direct pulse generator 403 to produce a new pulse. An arbitrary number of scan chains 406 may be so employed to generate a chip identifier of arbitrary length.

Figure 5:
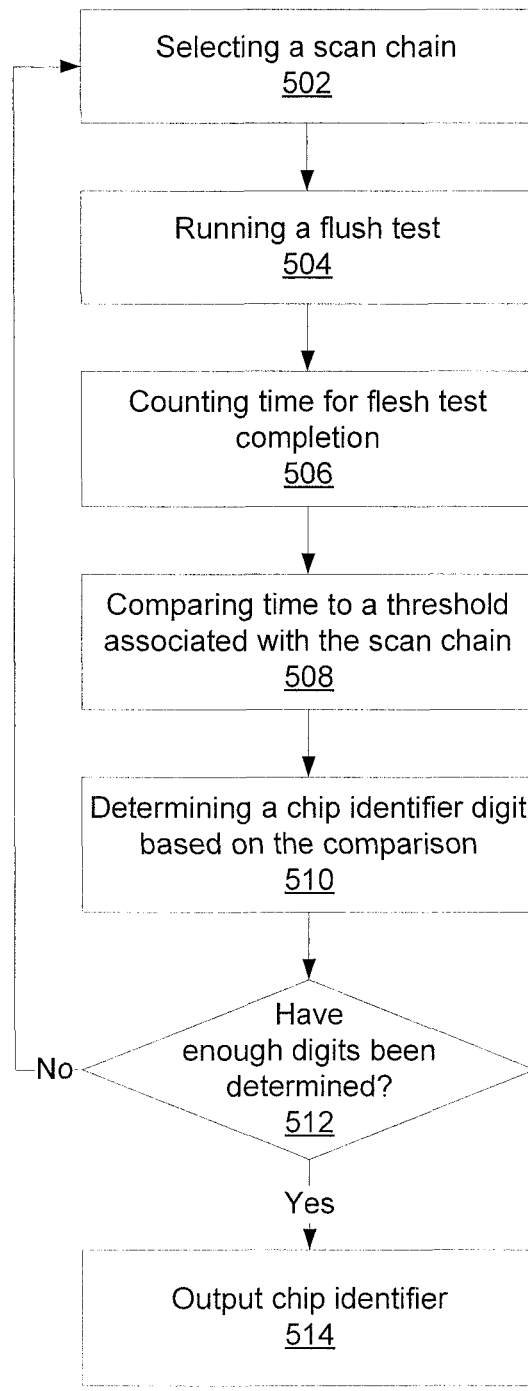
FIG. 5 is a block/flow diagram for creating a circuit identifier in accordance with one illustrative embodiment.

Referring now to FIG. 5, an exemplary method for determining a chip's unique identifier is described. Block 502 selects a scan chain 406 using control module 410 and multiplexer 404. Block 504 conducts a flush test by sending a pulse across scan chain 406 using pulse generator 403. Block 506 counts the duration of the pulse delay as the pulse propagates through the latches in scan chain 406 using counter 402.

Block 508 compares the counted duration of the pulse to a threshold associated with the particular scan chain being used. Because each scan chain will have a different expected delay that corresponds to its length, a system that has scan chains of varying lengths will have stored an equal number of thresholds. The result of the comparison at block 508 is used in block 510 to determine one digit of a chip identifier. For example, if the threshold is exceeded the digit may be determined to be a logical "1", and a logical "0" otherwise. In the event that the pulse duration is exactly equal to the threshold, either bit may be selected, but the same bit should consistently be applied for all such occurrences.

Alternatively, in the case where the pulse duration falls within a given range of the threshold, a third "indeterminate" state may be set for that bit. This accommodates the case where the random process variations produce a scan chain that has an actual delay very close to the expected delay, such that environmental effects dominate. For example, in such a case, temperature fluctuations might cause the delay to cross the threshold, producing a "0" in some cases and a "1" in others. As such, if the bit falls within a sufficiently small range around the threshold, confidence in that bit is diminished. An indeterminate bit may be ignored for the purposes of authentication, such that such a circumstance is not fatal to authentication. By providing for indeterminate bits, reliable performance can be achieved at the expense of requiring additional bits to achieve the same level of security. The user may set a limit on the number of indeterminate bits that are accepted upon authentication and may increase the number of desired bits accordingly.

Similarly, an intermediate state may be used if a scan chain 406 fails to communicate a pulse at all. For example, if the counter 402 registers a delay substantially longer than the expected delay (e.g., greater by an order of magnitude), the counter 402 may communicate to the control module 410 the failure of the scan chain 406. This allows a chip to properly authenticate, even if the chip has suffered a partial failure.

Block 512 determines whether enough digits have been determined. A chip's identifier may have an arbitrary number of digits, e.g., 128 bits, and block 512 continues the loop until that number has been reached by returning processing to block 502 for the selection of the next scan chain. Once enough digits have been determined, block 514 outputs the chip identifier, which may be used for the purpose of authenticating the device.

Figure 6:
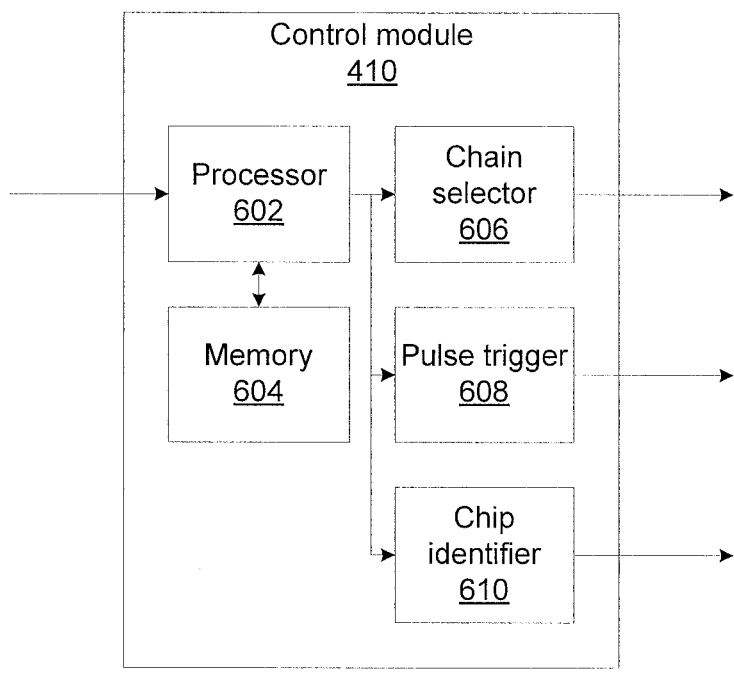
FIG. 6 is a diagram of an identifier control module in accordance with one illustrative embodiment.

Referring now to FIG. 6, a detailed diagram of control module 410 is shown. The control module 410 includes a processor 602 in communication with a memory 604. The processor 602 may be a dedicated application-specific circuit in its own right, or it may be a more generalized processor that is part of e.g., a built-in self-test system. The processor 602 is in communication with a persistent memory 604 that stores the thresholds associated with the scan chains. The processor furthermore receives timing from the counter 402 and performs comparisons of said timing information against the stored thresholds.

When conditions are met (e.g., when the counter provides a pulse's timing information), the processor 602 instructs a chain selector 606 to communicate with multiplexers 404 and 408 to select a new chain. Processor 602 further instructs pulse trigger 608 to communicate with pulse generator 403 to initiate a new test pulse across the selected chain. In this way, the processor 602 generates bits for the chip identifier 610. The processor may store said bits in memory 604 until the full identifier is complete, or it may output the bits as they are generated.

Figure 7:
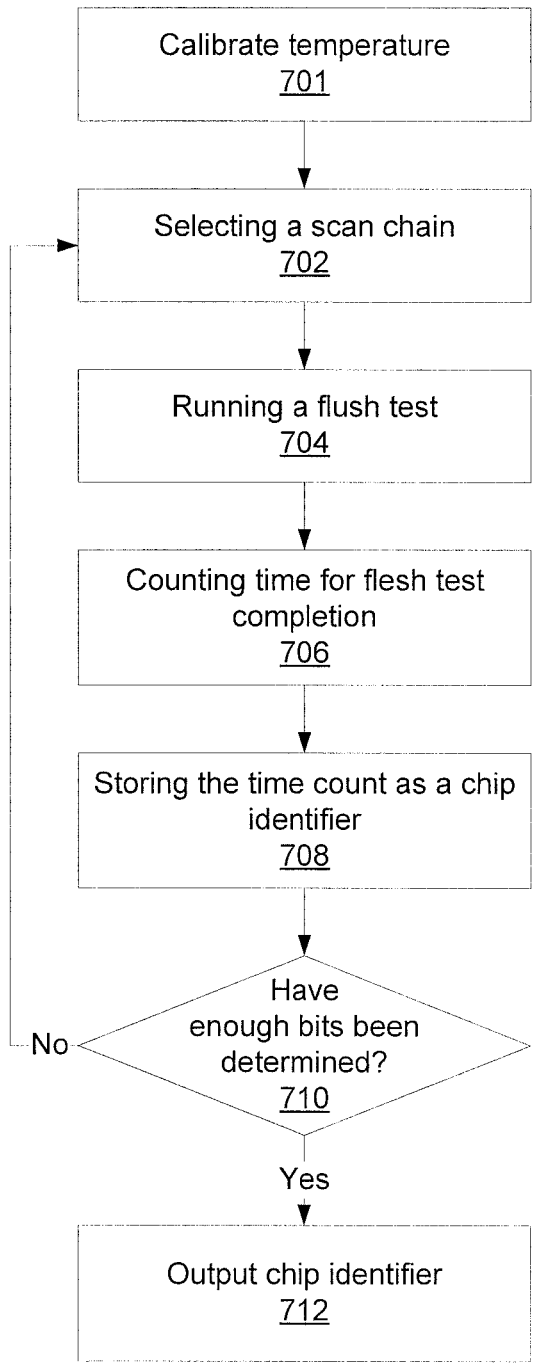
FIG. 7 is a block/flow diagram for creating a circuit identifier in accordance with another illustrative embodiment.

Referring now to FIG. 7, an alternative embodiment of a method for determining a chip's unique identifier is described. As compared to the method of FIG. 5, this embodiment simplifies the determination of a chip identifier by using a delay time directly as a chip identifier. Block 701 performs a temperature calibration. This temperature calibration is used to account for temperature fluctuations that might affect propagation times. An exemplary calibration might include determining the temperature on the chip and outputting that temperature. Block 702 selects a scan chain from among scan chains 406 using, e.g., the multiplexer 404. Block 704 initiates a flush test in the selected scan chain using pulse generator 403. Block 706 uses, e.g., counter 402 to determine the amount of time for the generated pulse to traverse the entire scan chain 406.

This time is stored as a chip identifier 708. Rather than comparing the time to a threshold, as described above with respect to FIG. 5, the time value may be used directly. Decision block 710 determines whether enough bits have been generated. If not, processing returns to block 702 and a new scan chain is selected. If so, block 712 outputs the stored chip identifier. As noted above, the chip identifier will be temperature-dependent, such that the calibration information and the stored chip identifier together may be used to authenticate the device.

The time count may optionally be truncated during storing. For example, a number of the least significant digits may be truncated to remove the effects of uncompensated environmental effects. Furthermore, a number of the most significant digits may be truncated, because these represent the bulk of the delay and are unlikely to change from chip to chip due to process variations. In most realistic embodiments, the time count will overflow the size of the counter, effectively truncating the most significant bits automatically.

Having described preferred embodiments of a system and method for chip authentication using scan chains (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating an identifying number, comprising:
   determining a propagation time delay across a scan chain of known length comprising a plurality of latches;
   generating one or more identifier bits based on the propagation time delay using a processor;
   repeating said determining and generating until a number of stored identifier bits reaches a threshold number; and
   outputting the stored identifier bits.

2. The method of claim 1, further comprising calibrating the counter based on the present temperature.

3. The method of claim 2, further comprising truncating one or more bits from the propagation delay before using the delay information as identifier bits.

4. The method of claim 1, further comprising selecting a new scan chain after one or more identifiers bit has been generated.

5. The method of claim 4, wherein all scan chains have the same length.

6. The method of claim 4, wherein at least one scan chain has a length different from other scan chains.

7. The method of claim 1, wherein the scan chain is formed from paired latches having a scan mode and an operating mode, such that the latches are connected serially when in the scan mode and in parallel when in the operating mode.

8. A method for generating an identifying number, comprising:
   determining a propagation time delay across a scan chain of known length comprising a plurality of latches;
   comparing the propagation time delay to a threshold associated with the scan chain length;
   storing an identifier bit based on the result of said comparison;
   repeating said determining, comparing, and storing until a number of stored identifier bits reaches a threshold number; and
   outputting the stored identifier bits.

9. The method of claim 8, further comprising selecting a new scan chain after an identifier bit has been stored.

10. The method of claim 9, wherein all scan chains have the same length.

11. The method of claim 9, wherein at least one scan chain has a length different from other scan chains.

12. The method of claim 8, further comprising storing an indeterminate state for the identifier bit if the propagation time delay falls within a predetermined range of the threshold.

13. The method of claim 8, further comprising storing an indeterminate state for the identifier bit if the propagation time delay is greater than a second, timeout threshold.

14. The method of claim 8, wherein the scan chain is formed from paired latches having a scan mode and an operating mode, such that the latches are connected serially when in the scan mode and in parallel when in the operating mode, wherein the counter and processor are configured to repeat the determination of the pulse delay and the generation of the identifier until a number of stored identifier bits reaches a threshold number.

15. A non-transitory computer readable storage medium comprising a computer readable program for generating an identifying number, wherein the computer readable program when executed on a computer causes the computer to perform the steps of claim 8.

16. A method for generating an identifying number, comprising:
- selecting a scan chain of known length comprising a plurality of latches from a plurality of scan chains;
- determining a propagation time delay across the selected scan chain;
- comparing the propagation time delay to a threshold associated with the scan chain length;
- storing an identifier bit based on the result of said comparison, including:
  - storing a first state for the identifier bit if the propagation time delay exceeds the threshold;
  - storing a second state for the identifier bit if the propagation time delay is below the threshold;
  - storing a third state for the identifier bit if the propagation time delay is within a predetermined range of the threshold; and
  - storing the third state for the identifier bit if the propagation time delay is above a second, timeout threshold;
- repeating said selecting determining, comparing, and storing until a number of stored identifier bits reaches a threshold number; and
- outputting the stored identifier bits.

17. A chip identifier circuit comprising:
- one or more scan chains of known length, comprising a plurality of latches, having an associated expected delay;
- a pulse generator configured to send a pulse through the one or more scan chains;
- a counter configured to determine a pulse delay;
- a processor configured to
  - generate an identifier bit based on the determined pulse delay;
  - repeat said determining and generating until a number of stored identifier bits reaches a threshold number; and
  - output the stored identifier bits.

18. The circuit of claim 17, comprising a plurality of scan chains and a selection circuit configured to selectively connect a single scan chain to the pulse generator and the counter.

19. The circuit of claim 18, wherein all scan chains have the same length.

20. The circuit of claim 18, wherein at least one scan chain has a length different from other scan chains.

21. The circuit of claim 18, wherein the selection circuit is a multiplexer.

22. The circuit of claim 17, wherein the processor is configured to compare the pulse delay to a threshold based on the expected delay and output an identifier bit according to said comparison.

23. The circuit of claim 22, wherein the processor is further configured to output an indeterminate state for the identifier bit if the propagation time delay falls within a predetermined range of the threshold.

24. The circuit of claim 22, wherein the processor is further configured to output an indeterminate state for the identifier bit if the propagation time delay is greater than a second, timeout threshold.

25. The circuit of claim 22, wherein the one or more scan chains are formed from paired latches having a scan mode and an operating move, such that the latches are connected serially when in the scan mode and in parallel when in the operating mode.

* * * * *